United States Patent [19]

Tanaka et al.

[11] Patent Number: 5,444,625
[45] Date of Patent: Aug. 22, 1995

[54] TARGET SLIPPAGE RATIO SETTING DEVICE

[75] Inventors: Keishin Tanaka; Toichiro Hikichi; Chiaki Kumagai, all of Wako, Japan

[73] Assignee: Honda Giken Kogyo Kabushiki Kaisha, Tokyo, Japan

[21] Appl. No.: 82,833

[22] Filed: Jun. 28, 1993

[30] Foreign Application Priority Data

Jun. 29, 1992 [JP] Japan .................................. 4-171112

[51] Int. Cl.[6] ............................................. B60T 8/32
[52] U.S. Cl. ................................ 364/426.03; 180/197; 303/169
[58] Field of Search ....................... 364/426.02, 426.03, 364/426.01; 180/197, 233, 248; 303/100, 103

[56] References Cited

U.S. PATENT DOCUMENTS 4,884,651 12/1989 Harada et al. ................... 364/426.03
5,070,961 12/1991 Tezuka ................................ 180/197
5,090,510 2/1992 Watanabe et al. ................... 180/197
5,246,278 9/1993 Yoshino et al. ................. 364/426.02

FOREIGN PATENT DOCUMENTS

63-258254 10/1988 Japan .

Primary Examiner—Gary Chin

[57] ABSTRACT

A target slippage ratio setting device has sensors respectively mounted on driven and driving wheels so as to detect rotational velocities thereof, a body accelerometer attached to a main body of a vehicle, a steering angle sensor mounted on a handle, and a control unit. In the target slippage ratio setting device, a target slippage ratio at which the optimum braking force is obtained, can be determined from a coefficient of friction calculated by a friction coefficient calculating circuit, a banking angle calculated by a banking angle calculating circuit and an estimated velocity of the vehicle calculated by an estimated vehicle velocity calculating circuit, based on the peripheral velocities of the front and rear wheels and the acceleration or deceleration of the vehicle.

12 Claims, 12 Drawing Sheets

| Vref | 0~60 km/h | 60~70 km/h | 70~ km/h |
|---|---|---|---|
| NO-brake | (III) | (IV) / (V) | (VI) |
| braking | (I) | (II) | |

TARGET SLIPPAGE RATIO SETTING DEVICE

BACKGROUND OF THE INVENTION

1. Field of the invention

This invention relates to a target slippage ratio setting device mounted on a vehicle like a motorcycle or car, for setting a slippage ratio for optimum braking.

2. Description of the Related Art

Brake control systems for motor vehicles are known which compare the peripheral speed of each wheel of a vehicle under braking and traveling conditions, and controls the braking based on the result of comparison. In this type of brake control system, a slippage ratio is calculated based on the peripheral velocity of each wheel and the velocity of the vehicle. When the slippage ratio reaches or exceeds a target slippage ratio at which the optimum braking is carried out, the hydraulic pressure of the brake is reduced. In this condition, the peripheral velocity of each wheel is controlled so as to reduce the slippage ratio, thereby obtaining a satisfactory braking force. In this case, the target slippage ratio is set depending on a coefficient of friction of a road surface.

If the target slippage ratio is established taking into account information about the behavior of the vehicle or other information other than the coefficient of friction of the road surface, then further control of braking can be carried out. Information about the vehicle's banking angle (i.e. the angle of inclination of the vehicle from the vertical in a direction perpendicular to the traveling direction of the vehicle), may be input to the conventional brake control system to control in a more satisfactory manner. An example is disclosed in Japanese Patent Application Laid-Open Publication No. 63-258254. Thus, there has been a demand for a system for setting a target slippage ratio based on the information about the behavior of the vehicle.

SUMMARY OF THE INVENTION

The present invention was made to meet such a demand. Therefore, the object of the present invention is to provide a target slippage ratio setting device capable of setting a target slippage ratio based on information about the behavior of a vehicle and the like.

To achieve the above object, the device for setting the target slippage ratio according to the present invention comprises wheel velocity detecting means for detecting peripheral velocities of front and rear wheels, vehicle acceleration detecting means for detecting an acceleration or deceleration of a vehicle, estimated vehicle velocity calculating means for calculating an estimated velocity of the vehicle based on the peripheral velocities of the front and rear wheels and the acceleration or deceleration of the vehicle, banking angle calculating means for calculating a banking angle corresponding to a vehicle inclination extending from a vehicle running direction to a direction perpendicular to the vehicle running direction while the vehicle is running, friction coefficient calculating means for calculating a coefficient of friction between each wheel and a road surface based on both a slippage ratio of each wheel calculated from the peripheral velocity of each wheel and the estimated velocity of the vehicle, and the acceleration or deceleration of the vehicle, storing means for storing therein as data, a relationship between a slippage ratio at which the optimum braking force is obtained and a banking angle, a relationship between a slippage ratio and an estimated velocity of the vehicle, and a relationship between a slippage ratio and a coefficient of friction of the road surface, target slippage ratio setting means for setting a target slippage ratio based on the relationships from the banking angle, the estimated velocity of the vehicle and the coefficient of friction and means for controlling the brake system to apply a braking force to at least one of the front and rear wheels while maintaining the target slippage ratio.

The target slippage ratio setting device can calculate a target slippage ratio capable of providing the proper control of braking force from the estimated velocity of the vehicle, the banking angle and the coefficient of friction, based on the relationship stored as data in the storing means, between the estimated velocity of the vehicle, the banking angle and the coefficient of friction with respect to the slippage ratio at which the optimum braking force is obtained. Thus, the estimated velocity of the vehicle or the vehicle behavior such as the banking angle or the like can be included in setting the target slippage ratio.

In the target slippage ratio setting device, the storing means preferably stores therein as data, the relationship between the slippage ratio experimentally measured and at which the optimum braking force is obtained and the banking angle, the relationship between the slippage ratio and the estimated velocity of the vehicle and the relationship between the slippage ratio and the coefficient of friction of the road surface, in the form of approximate expressions. Alternatively, the storing means preferably stores therein as data in the form of an approximate expression, a relationship between two parameters of a banking angle, an estimated velocity of the vehicle and a coefficient of friction, and a slippage ratio at which the optimum braking force is obtained.

In the target slippage ratio setting device, the target slippage ratio setting means can set a target. slippage ratio based on the correlation between respective slippage ratios each obtained based on the estimated velocity of the vehicle, the banking angle and the coefficient of friction and capable of providing the optimum braking force.

When the target slippage ratio setting device is equipped on a known brake control system, a ratio (Smax/SO) of a target slippage ratio Smax set by the target slippage ratio setting device to a target slippage ratio SO set by the brake control system is calculated. The so-calculated ratio can also be outputted to the brake control system and multiplied by the value of a control signal for opening and closing a valve employed in the brake control system.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENT

A description will be made of a target slippage ratio setting device which has been incorporated into a brake control system of a motorcycle.

Figure 1:
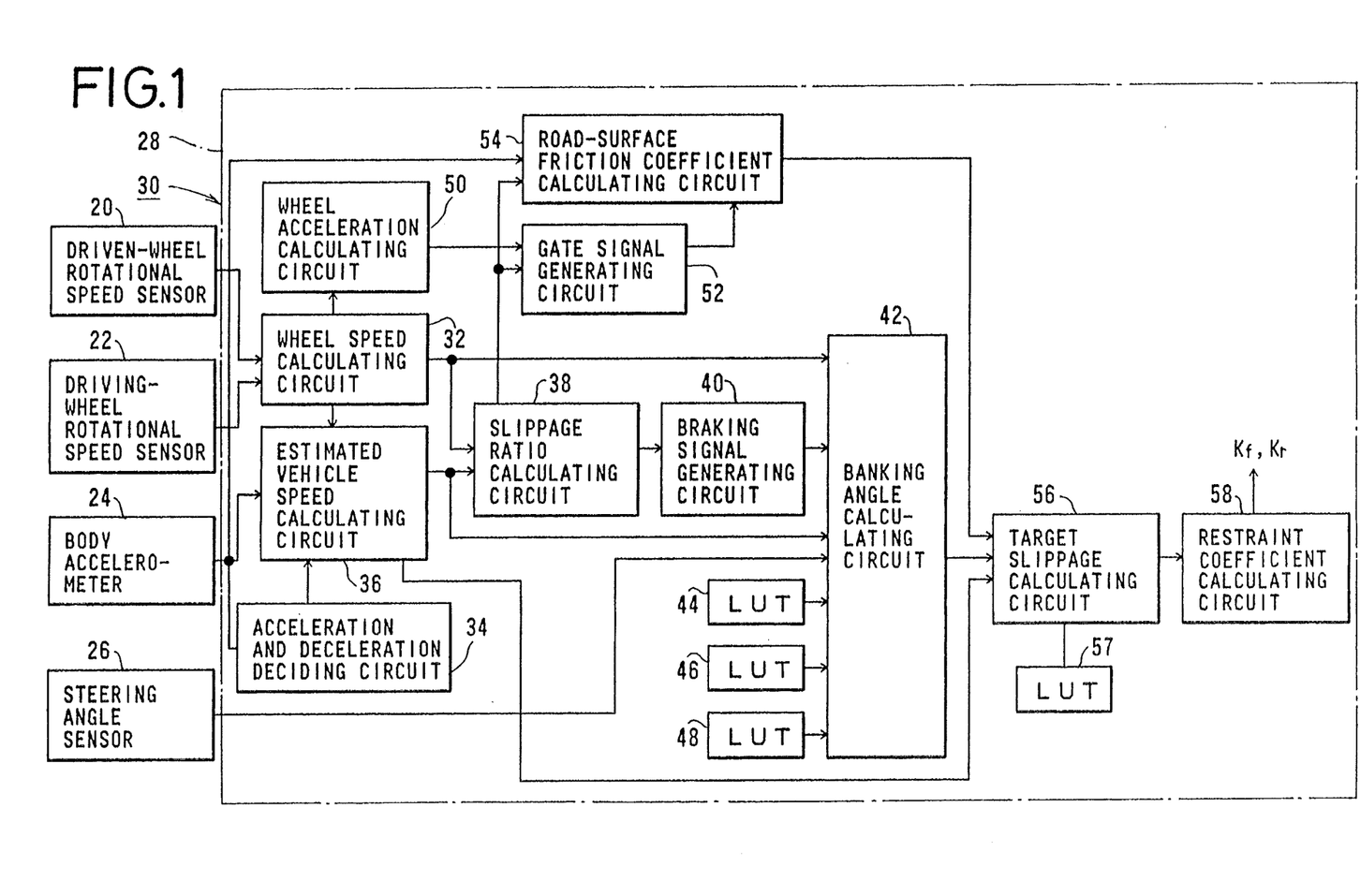
FIG. 1 is a block diagram showing the overall structure of a target slippage ratio setting device according to the present invention.
Figure 2:
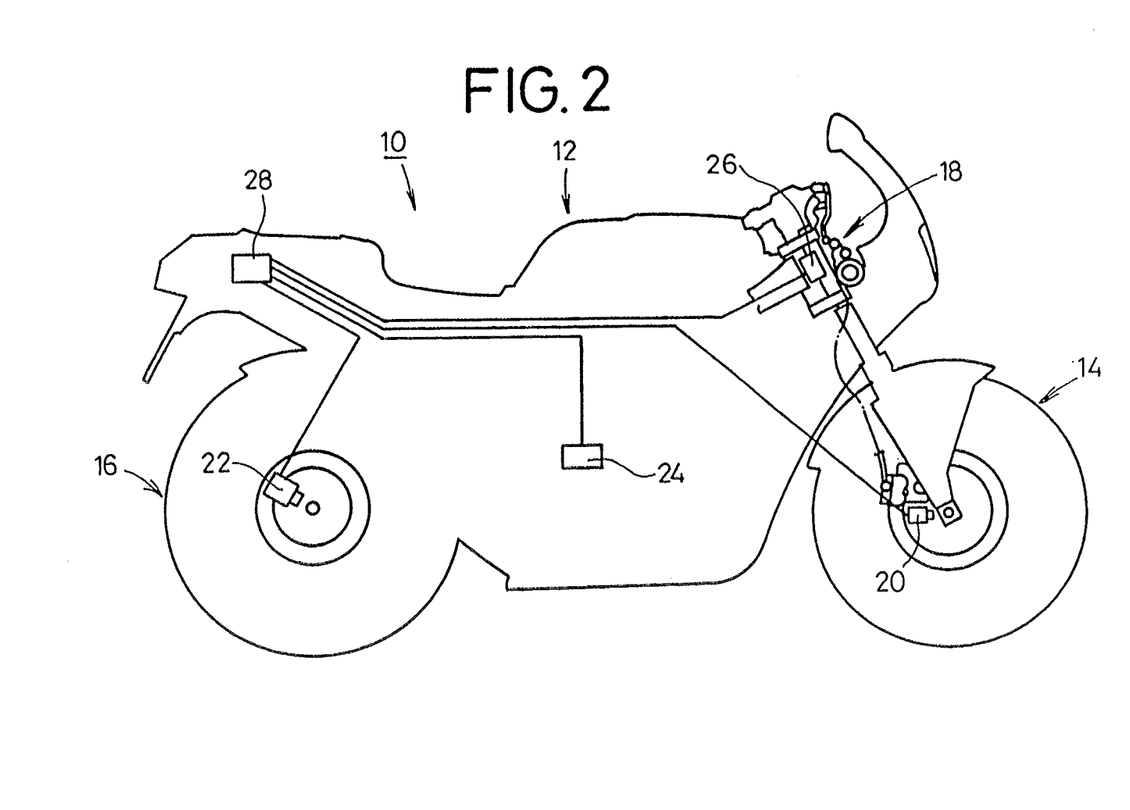
FIG. 2 is a schematic view illustrating a motorcycle equipped with the target slippage ratio setting device of the present invention.

In FIG. 2, motorcycle 10 has a main body 12, a front wheel 14, a rear wheel 16 and a handle 18. Respectively mounted on the front (driven) wheel 14 and back (driving) wheel 16 are sensors 20 and 22 for detecting the rotational velocity or speed of the respective wheels, each comprising a rotary encoder or the like. Further, a body accelerometer or acceleration sensor 24 is attached to the main body 12 and a steering angle sensor 26 is mounted on the handle 18. The sensors 20, 22, 24 and 26 are electrically connected to a control unit 28. A target slippage ratio setting device 30 shown in FIG. 1 is made up of these components.

The control unit 28 comprises a wheel speed calculating circuit 32 for calculating peripheral velocities $V_{wf}$ and $V_{wr}$ of the front and rear wheels 14 and 16 based on signals outputted from the sensors 20 and 22; an acceleration and deceleration deciding circuit 34 for determining whether the motorcycle 10 is in an accelerated or decelerated state, based on a signal outputted from the sensor 24; an estimated vehicle velocity calculating circuit 36 for calculating an estimated velocity of the vehicle $V_{ref}$ based on a wheel peripheral speed signal outputted from the wheel speed calculating circuit 32, a vehicle acceleration and deceleration signal outputted from the sensor 24 and an acceleration and deceleration deciding signal outputted from the acceleration and deceleration deciding circuit 34; a slippage ratio calculating circuit 38 for calculating slippage ratios $S_f$ and $S_r$ of the front and rear wheels 14 and 16 based on the wheel peripheral velocities $V_{wf}$ and $V_{wr}$ and the estimated velocity of the vehicle $V_{ref}$; a braking signal generating circuit 40 for deciding, based on the slippage ratios $S_f$ and $S_r$, whether the braking has been carried out and for generating braking signals $\lambda_{B1}$ and $\lambda_{B2}$ based on the result of the decision; a banking angle calculating circuit 42 for calculating a banking angle $\theta_B$ based on the estimated velocity of the vehicle $V_{ref}$, the wheel peripheral velocities $V_{wf}$ and $V_{wr}$, the braking signals $\lambda_{B1}$ and $\lambda_{B2}$ and a steering angle signal detected by the steering angle sensor 26 all of which are supplied thereto; look-up tables (hereinafter called "LUTs") 44, 46 and 48 (to be described later) for outputting predetermined data to the banking angle calculating circuit 42; a wheel acceleration calculating circuit 50 for calculating peripheral accelerations $\alpha_{wf}$ and $\alpha_{wr}$ of the front and rear wheels 14 and 16 based on the peripheral velocities $V_{wf}$ and $V_{wr}$ of the wheels; a gate signal generating circuit 52 for generating a gate signal based on the respective peripheral accelerations of the wheels $\alpha_{wf}$ and $\alpha_{wr}$ and the slippage ratios $S_f$ and $S_r$; a road-surface friction coefficient calculating circuit 54 for calculating coefficients of friction $\lambda_f$ and $\mu_r$ between the road surface and the front and rear wheels 14 and 16 based on the acceleration of the vehicle $G_x$ and the slippage ratios $S_f$ and $S_r$ in response to the gate signal; a target slippage ratio calculating circuit 56 for calculating target slippage ratios $Smax_f$ and $Smax_r$ for obtaining the optimum braking force, based on the estimated velocity of the vehicle $V_{ref}$, the banking angle $\theta_B$ and the coefficients of friction $\mu_f$ and $\lambda_r$; a LUT 57 for outputting predetermined data to the target slippage ratio calculating circuit 56; and a restraint coefficient calculating circuit 58 for calculating control or restraint coefficients $K_f$ and $K_r$ based on ratios between the target slippage ratios $Smax_f$ and $Smax_r$ and their corresponding target slippage ratios $SO_f$ and $SO_r$ as provided by a conventional system.

The target slippage ratio setting device 30 constructed as described above, calculates the target slippage ratios $Smax_f$ and $Smax_r$ (restraint coefficients $K_f$ and $K_r$) in the following manner. Since the target slippage ratio $Smax_f$ with respect to the front wheel 14, and the target slippage ratio $Smax_r$ with respect to the rear wheel 16, are calculated in a substantially identical way, only the way of calculating the target slippage ratio $Smax_f$ will be described.

That is, the target slippage ratio $Smax_f$ capable of providing the optimum control force with respect to the estimated velocity of the vehicle $V_{ref}$, the banking angle $\theta_B$ and the coefficient of friction $\mu_f$, are calculated. Further, when the target slippage ratio setting device according to the present invention, is equipped to a conventional brake control system, the ratio (=restraint coefficient $K_f$) of $Smax_f$ to $SO_f$, the target slippage ratio of the conventional system, is calculated by:

$$K_f = Smax_f / SO_f$$

The actual control of braking of the vehicle is carried out by multiplying a signal produced from an output device, such as a valve signal used for controlling the hydraulic pressure of the brake, by the so-calculated restraint coefficient $K_f$.

A description regarding the determination of the estimated velocity of the vehicle $V_{ref}$, the banking angle $\theta_B$ and the coefficient of friction $\mu_f$ will first be made. Thereafter, a description regarding the determination of the target slippage ratio $Smax_f$ and the restraint coefficient $K_f$ will be successively made.

In the present invention, the peripheral velocities of the driven and driving wheels $V_{wf}$ and $V_{wr}$ are calculated and the estimated velocities of the vehicle $V_{ref}$ are calculated based on the peripheral velocities of the wheels $V_{wf}$ and $V_{wr}$. Then, a description regarding determination of the estimated velocity of the vehicle $V_{ref}$ based on the peripheral speed of the driven wheel (front wheel 14) $V_{wf}$ will be made with reference to the flowchart of FIG. 3 and to FIGS. 4 and 5.

Figure 4:
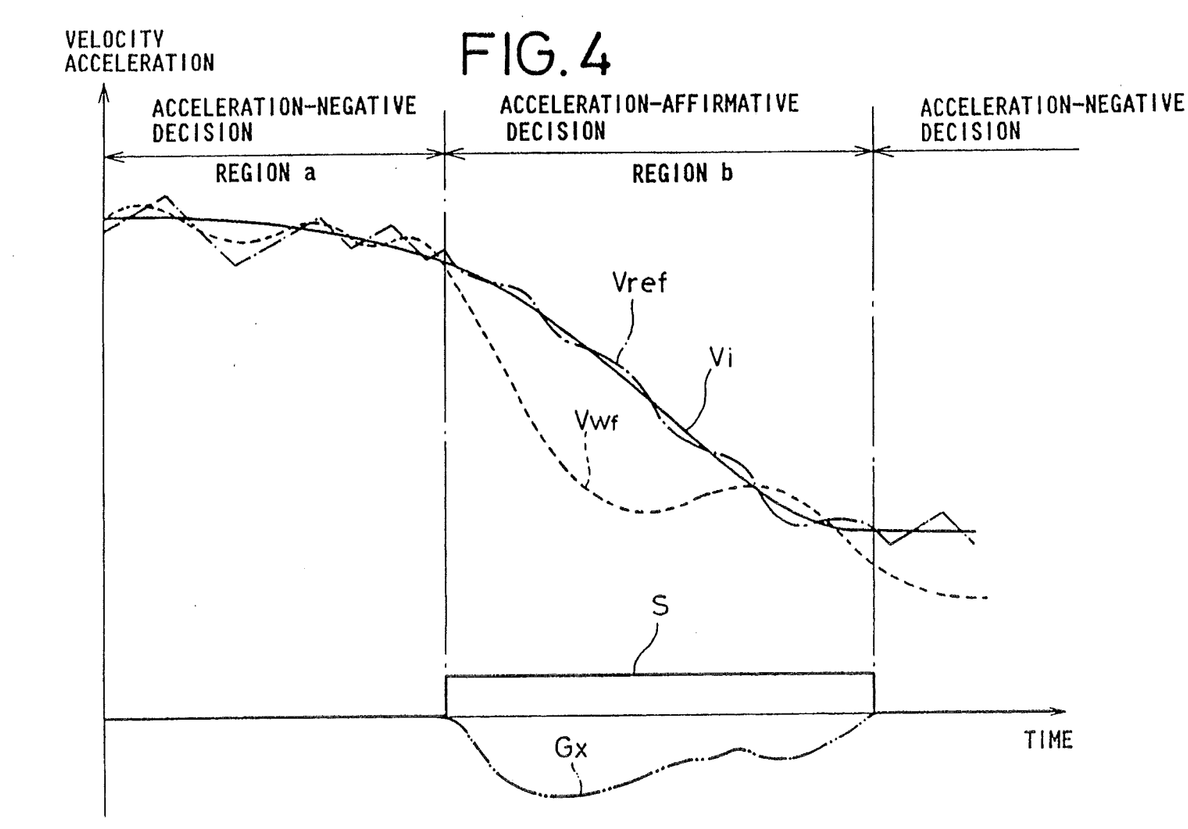
FIG. 4 is a graph for explaining the result of calculation of the estimated velocity of the vehicle by the target slippage ratio setting device of the present invention.
Figure 5:
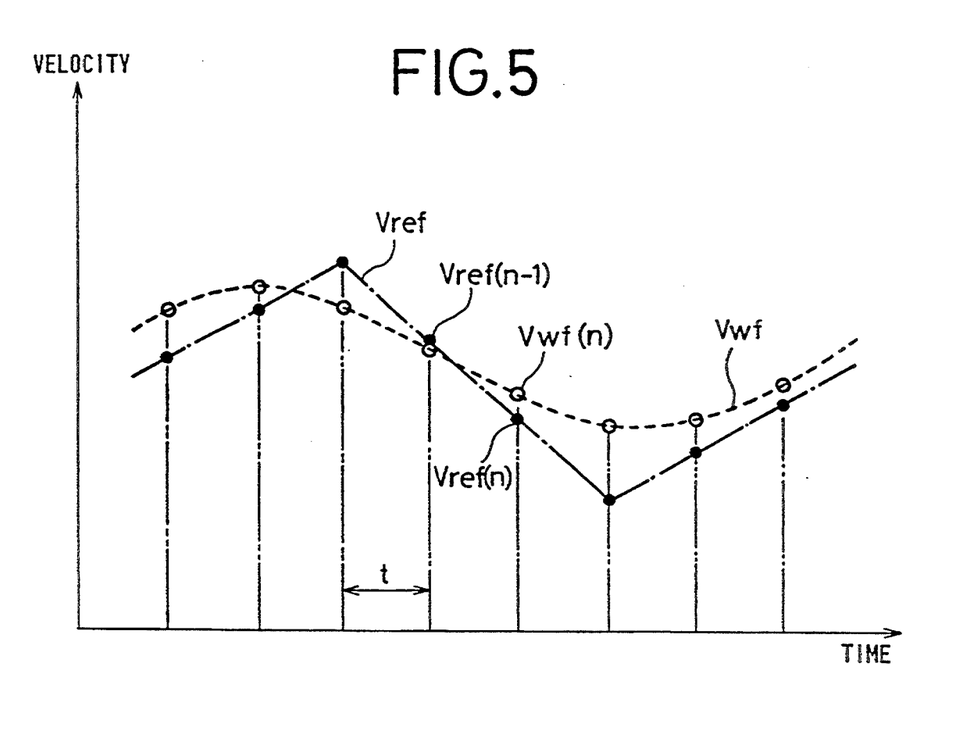
FIG. 5 is a graph for explaining the way of calculating the estimated velocity of the vehicle by the target slippage ratio setting device of the present invention.

In FIG. 4, there is shown the relationship between an actual or true velocity of the vehicle $V_i$ (solid line), the peripheral velocity of the wheel $V_{wf}$ (dashed line) and the estimated velocity of the vehicle $V_{ref}$ (chain line), the latter two being detected by the target slippage ratio setting device 30. The true velocity of the vehicle $V_i$ is shown for demonstrating the reliability of the estimated velocity of the vehicle $V_{ref}$, which has been determined by the target slippage ratio setting device 30 according to the present invention. The velocity of the vehicle $V_i$ represents a value which has been experimentally measured by a high-precision laser Doppler radar, a velocity detecting wheel or the like. Such devices cannot be normally equipped on vehicles due to their cost, size and weight. However, the friction coefficients of the road surface can be determined with sufficient accuracy by the target slippage ratio setting device according to the present invention, without these expensive devices. The graph shown in FIG. 4 is substantially divided into two regions, a region a in which the vehicle is not being accelerated, and a region b in which the vehicle is being accelerated. FIG. 5 is an enlarged diagram of the region a shown in FIG. 4.

In the target slippage ratio setting device 30, a decision is made as to whether the vehicle is being accelerated or decelerated, based on the acceleration of the vehicle $G_x$. Methods of calculating the estimated velocity of the vehicle $V_{ref}$ are separately employed depending on the region, i.e. region a in FIG. 4, in which the vehicle is not being accelerated and region b in FIG. 4, in which the vehicle is being accelerated. The estimated vehicle velocity calculating circuit 36 calculates an estimated velocity of the vehicle $V_{ref(n)}$ for each predetermined computing interval t in the following manner. Here, (n) in $V_{ref(n)}$ indicates a value obtained in an nth computing cycle.

Figure 3:
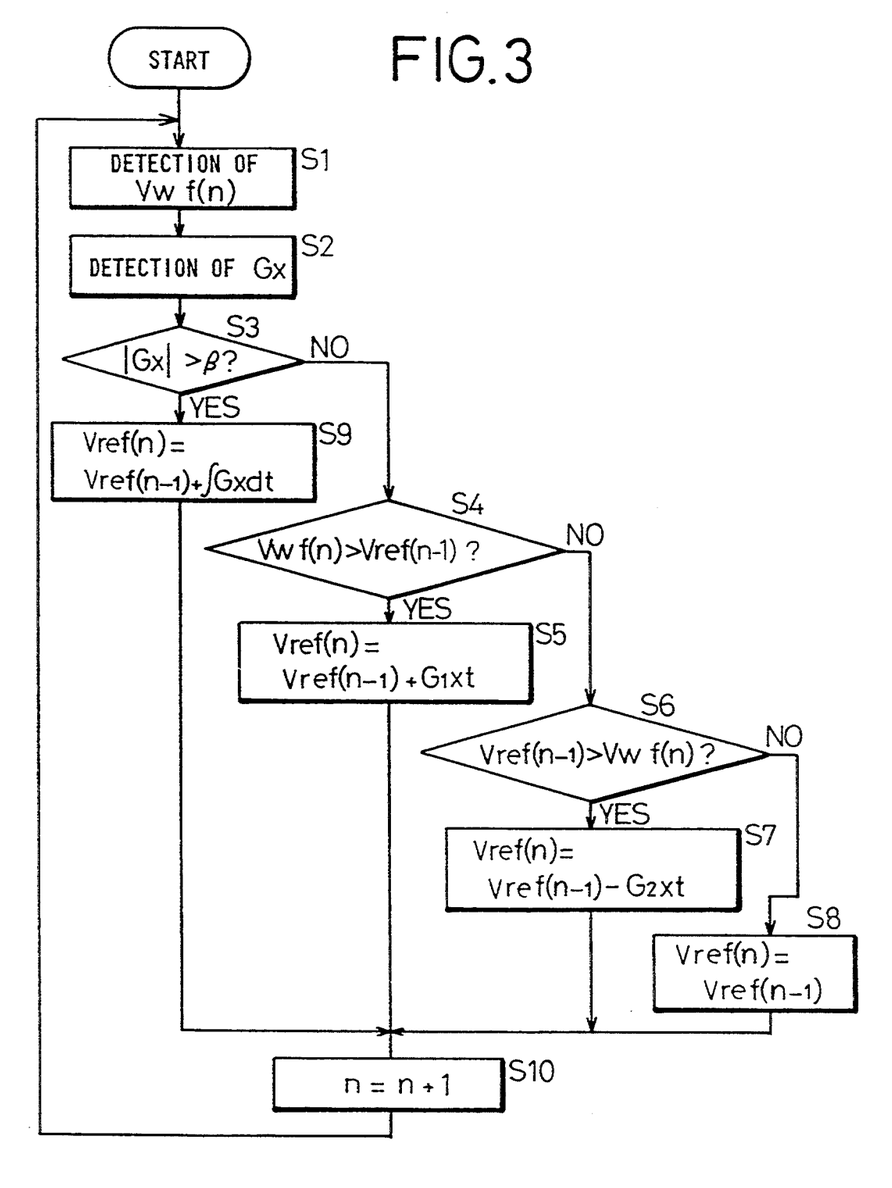
FIG. 3 is a flowchart for describing the way of calculating an estimated velocity of a vehicle by the target slippage ratio setting device of the present invention.

During a time interval in which the motorcycle 10 is running, the sensor 20 first senses the rotational speed of the driven wheel (front wheel 14) as a pulse train and outputs it to the wheel speed calculating circuit 32. The wheel velocity calculating circuit 32 calculates the peripheral velocity of the front wheel $V_{wf(n)}$ based on the pulse train per unit time interval (Step S1) and outputs it to the estimated vehicle velocity calculating circuit 36.

On the other hand, the sensor 24 attached to the main body 12 detects the acceleration of the vehicle $G_x$ (Step S2) and outputs it to the acceleration and deceleration deciding circuit 34 and the estimated vehicle velocity calculating circuit 36.

Then, the acceleration and deceleration deciding circuit 34 makes a decision whether the absolute value of the acceleration of the vehicle $G_x$ is greater than a predetermined value $\beta$ ($|G_x| > \beta$, where $\beta > 0$) (Step S3). If $|G_x| > \beta$, it is decided that there is acceleration. If not so, it is decided that there is no acceleration. The threshold value $\beta$ has been introduced to make a stable decision on the acceleration of the vehicle $G_x$ in the presence of noise.

If the answer is NO in Step S3, then the difference between the wheel peripheral velocity $V_{wf(n)}$ and the actual vehicle velocity $V_i$ is normally slight as indicated by the region a in FIG. 4. It is also considered that the acceleration of the vehicle $G_x$ (as detected by sensor 24) falls in the presence of noise produced due to vibrations of the motorcycle 10, for example. Then, if the acceleration deciding signal indicative of the absence of the acceleration is supplied from the acceleration and deceleration deciding circuit 34, then the estimated vehicle velocity calculating circuit 36 calculates the estimated velocity of the vehicle $V_{ref(n)}$ based on a preset acceleration or deceleration which will be described below.

That is, if it is decided in Step S3 that there is no acceleration, it is then determined whether the wheel peripheral velocity $V_{wf(n)}$ inputted this time greater than an estimated velocity of the vehicle $V_{ref(n-1)}$ obtained in the previous computation (Step S4). If the answer is YES in Step S4, then the estimated velocity of the vehicle $V_{ref(n)}$ is determined by the following equation (Step S5):

$$V_{ref(n)} = V_{ref(n-1)} + G_1 \times t$$

where $G_1$ ($> 0$) is a preset acceleration, and t is a computing interval.

If the answer is NO in Step S4, it is then decided whether the estimated velocity of the vehicle $V_{ref(n-1)}$ is greater than the wheel peripheral velocity $V_{wf(n)}$ (Step S6). If the answer is YES in Step S6, then the estimated velocity of the vehicle $V_{ref(n)}$ is determined as follows (Step S7):

$$V_{ref(n)} = V_{ref(n-1)} - G_2 \times t$$

where $G_2$ ($> 0$) and t are respectively a preset deceleration and a computing interval.

If the answer is NO in Step S6 (that is, it is decided that the estimated velocity of the vehicle $V_{ref(n-1)}$ is equal to the wheel peripheral velocity $V_{ref(n)}$), then the estimated velocity of the vehicle $V_{ref(n)}$ is determined as follows (Step S8):

$$V_{ref(n)} = V_{ref(n-1)}$$

As has been described in Steps S4 through S8, the wheel peripheral velocity $V_{wf(n)}$ is compared with the estimated velocity of the vehicle $V_{ref(n-1)}$. Then, whether the vehicle is being accelerated or decelerated with respect to the previous estimated velocity of the vehicle $V_{ref(n-1)}$ or neither, is determined based on the result of comparison. Under the acceleration and deceleration $G_1$ and $G_2$ respectively set based on the result of determination, the estimated velocity of the vehicle $V_{ref(n)}$ is updated or the previous estimated velocity of the vehicle $V_{ref(n-1)}$ is maintained for the present estimated velocity. Since the acceleration of the vehicle $G_x$ is low (i.e., $G_x < \beta$) as indicated by the region a in FIG. 4 in this case, the slippage ratio $S_{f(n)}$ of the front wheel is small and the difference between the velocity of the vehicle $V_i$ and the wheel peripheral velocity $V_{wf(n)}$ decreases. Accordingly, the estimated velocity of the vehicle $V_{ref(n)}$ can be determined with high accuracy using the wheel peripheral velocity $V_{wf(n)}$ as an alternative to the velocity of the vehicle $V_i$.

Since, on the other hand, the wheels of the motorcycle 10 slip on the road surface upon deceleration, for example, the difference between the wheel peripheral velocity $V_{wf}$ and the actual velocity of the vehicle $V_i$ increases as illustrated by the region b in FIG. 4. Thus, when the estimated velocity of the vehicle $V_{ref(n)}$ is calculated based on the wheel peripheral velocity $V_{wf(n)}$ as described in Steps S4 through S8, an estimated velocity of the vehicle $V_{ref}$ close to the actual velocity of the vehicle $V_i$ cannot be obtained with high accuracy.

When it is decided by the acceleration and deceleration deciding circuit 34 that the acceleration of the vehicle $G_x$ is greater than the predetermined value $\beta$, it is decided that the vehicle is in an accelerated or decelerated state. The estimated velocity of the vehicle $V_{ref(n)}$ is determined as follows (Step S9):

$$V_{ref(n)} = V_{ref(n-1)} + /G_x dt$$

where t represents a computing interval.

Even if the peripheral velocity $V_{wf}$ of the rear wheel 16 is used, the estimated velocity of the vehicle $V_{ref}$ can be obtained in the same manner.

Thus, the estimated velocity of the vehicle $V_{ref(n)}$ can be obtained with high accuracy by making use of the value of the acceleration of the vehicle $G_x$ only when it is decided that the vehicle is in the accelerated or decelerated state.

The estimated velocity of the vehicle $V_{ref(n)}$ and the peripheral velocities $V_{wf(n)}$ and $V_{wr(n)}$ of the front and rear wheels 14 and 16 are supplied to the slippage ratio calculating circuit 38. The slippage ratio calculating circuit 38 calculates a slippage ratio $S_{f(n)}$ of the front wheel 14 and a slippage ratio $S_{r(m)}$ of the rear wheel 16 based on the estimated velocity of the vehicle $V_{ref(n)}$ and the wheel peripheral velocities $V_{wf(n)}$ and $V_{wr(n)}$ and outputs the same to the braking signal generating circuit 40. In the braking signal generating circuit 40, it is decided that the brake is in operation when each of the slippage ratios $S_{f(n)}$ and $S_{r(n)}$ is greater than 3%. Then, each of the braking signals $\lambda_{B1(n)}$ and $\lambda_{B2(n)}$ is set to ⌈1⌋ and outputted to the banking angle calculating circuit 42.

In the banking angle calculating circuit 42, the banking angle $\theta_B$ is determined in the following manner. A method of calculating the banking angle $\theta_B$ will be described with reference to a flowchart of FIG. 6.

Figure 6:
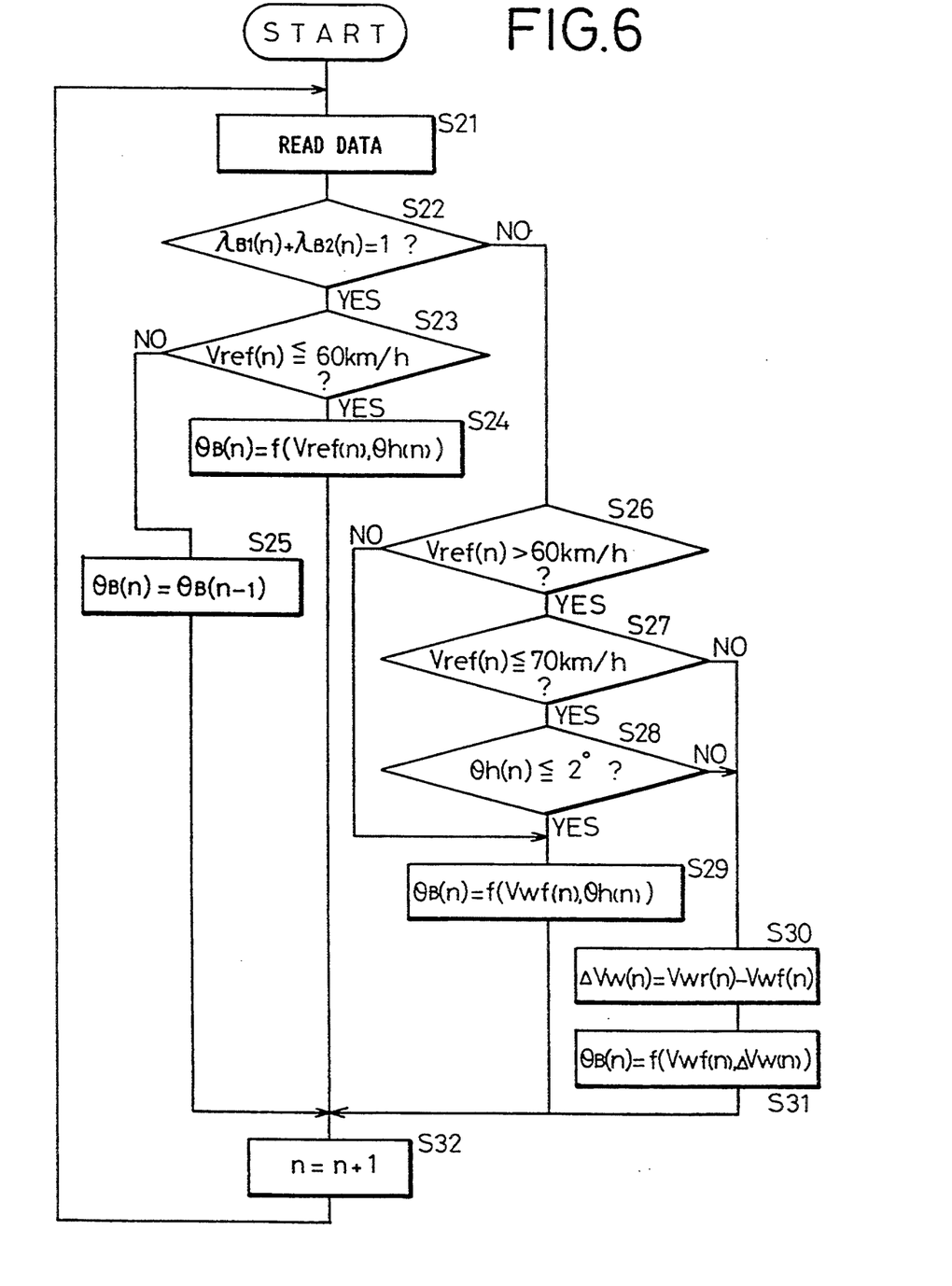
FIG. 6 is a flowchart for describing the way of calculating a banking angle by the target slippage ratio setting device of the present invention.
Figure 7:
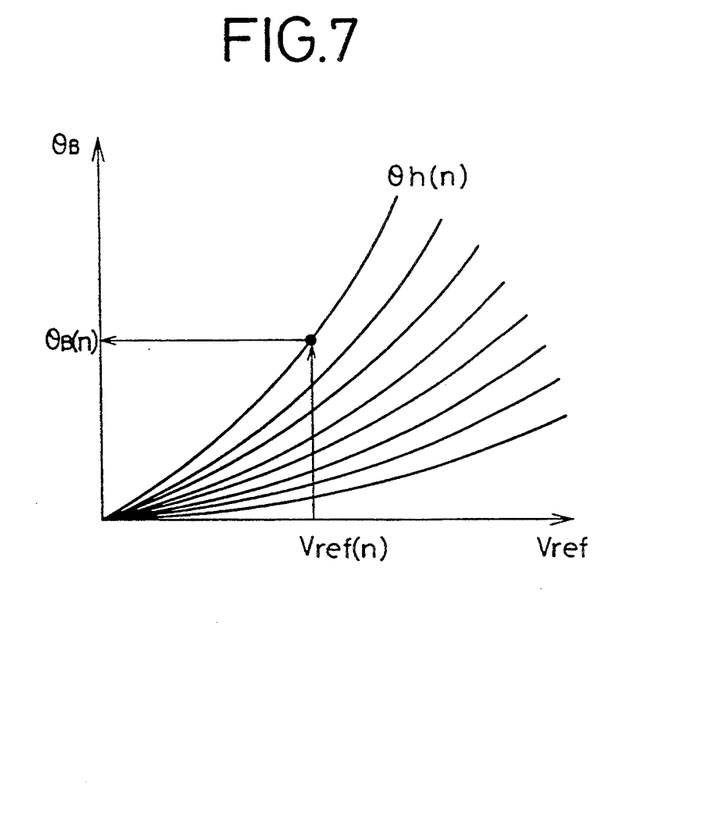
FIG. 7 is a graph for explaining a relationship between an estimated velocity of the vehicle and a banking angle at a certain steering angle, both of which are obtained by the target slippage ratio setting device of the present invention.

First, the estimated velocity of the vehicle $V_{ref(n)}$, the wheel peripheral velocities $V_{wf(n)}$ and $V_{wr(n)}$ and the braking signals $\lambda_{B1(n)}$ and $\lambda_{B2(n)}$, all of which have been determined in the above-described manner, and the steering angle $\theta_{h(n)}$ detected by the steering angle sensor 26 are read (Step S21). It is then decided whether a logical sum of the braking signals $\lambda_{B1(n)}$ and $\lambda_{B2(n)}$ is 1, that is, whether the brake is in operation (Step S22). If it is decided that the brake is in operation, it is then decided whether the estimated velocity of the vehicle $V_{ref(n)}$ is less than or equal to 60 km/h (Step S23). If the answer is YES in Step S23, then the banking angle $\theta_{B(n)}$ is determined from the estimated velocity of the vehicle $V_{ref(n)}$ and the steering angle $\theta_{h(n)}$ using the LUT 44 shown in FIG. 7 (see region (I) in FIG. 8). The relationship shown in FIG. 7 between the estimated velocity of the vehicle $V_{ref}$ and the banking angle $\theta_B$ at each steering angle $\theta_h$ set based on experimental data is stored in the LUT 44. The banking angle $\theta_{B(n)}$ is determined based on the data (see the arrow in FIG. 7) (Step S24).

Figure 8:
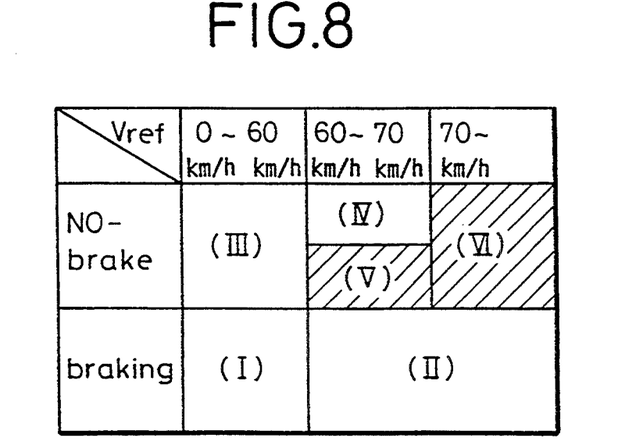
FIG. 8 is a table for explaining the way of calculating the banking angle by the target slippage ratio setting device of the present invention.

If it is decided in Step S23 that the estimated velocity of the vehicle $V_{ref(n)}$ is greater than or equal to 60 km/h, then the banking angle $\theta_{B(n)}$ is set to be the previous banking angle $\theta_{B(n-1)}$ (see region (II) in FIG. 8) (Step S25). The reason is that when the estimated velocity of the vehicle $V_{ref(n)}$ is greater than or equal to 60 km/h upon actuation of the brake, the difference in front and back wheel peripheral velocities, i.e., $\Delta V_w$ to be described later, is small because the brake is in operation and hence the banking angle $\theta_{B(n)}$ cannot be determined properly.

Figure 9:
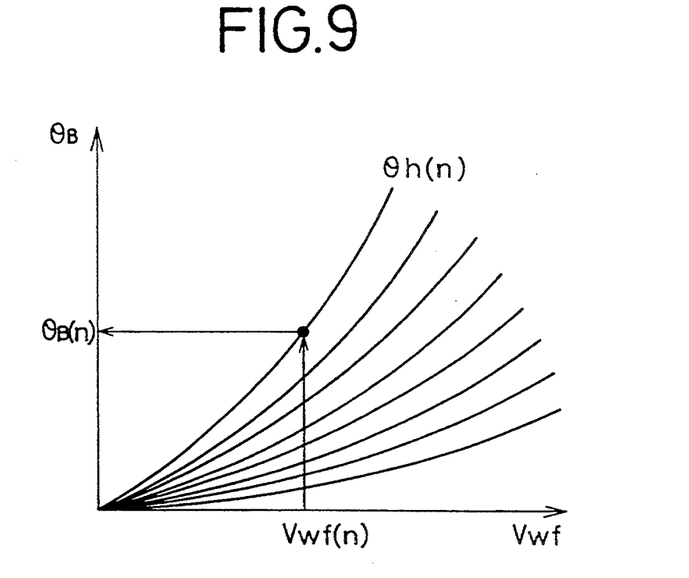
FIG. 9 is a graph for describing a relationship between a peripheral velocity of a driven wheel and a banking angle at a given steering angle, both of which are obtained by the target slippage ratio setting device shown in FIG. 1.

If it is decided in Step S22 that the brake is not being actuated (i.e., $\lambda_{B1(n)} + \lambda_{B2(n)} = 0$), it is then decided whether the estimated velocity of the vehicle $V_{ref(n)}$ is greater than 60 km/h (Step S26). If the answer is YES in Step S26, it is then decided whether the estimated velocity of the vehicle $V_{ref(n)}$ is less than or equal to 70 km/h (Step S27). If the answer is YES in Step S27, that is, 60 km/h $< V_{ref(n)} \leq$ 70 km/h, it is then decided whether the steering angle $\theta_{h(n)}$ is less than or equal to 2° (Step S28). If the answer is YES in Step S28 or it is decided in Step S26 that the estimated velocity of the vehicle $V_{ref(n)}$ is less than 60 km/h, it is then decided that there is a correlation between the banking angle $\theta_{B(n)}$ and the steering angle $\theta_{h(n)}$. Further, the banking angle $\theta_{B(n)}$ is determined based on the wheel peripheral velocity $V_{ref(n)}$ and the steering angle $\theta_{B(n)}$ using the LUT 46 shown in FIG. 9 (see regions (IV) and (III) in FIG. 8). The relationship between the peripheral velocity of the vehicle $V_{wf(n)}$ and the banking angle $\theta_s$ at each steering angle $\theta_h$ set based on experimental data, is stored in the LUT 46. The banking angle $\theta_{B(n)}$ is determined based on the data (see the arrow in FIG. 9) (Step S29).

Figure 10:
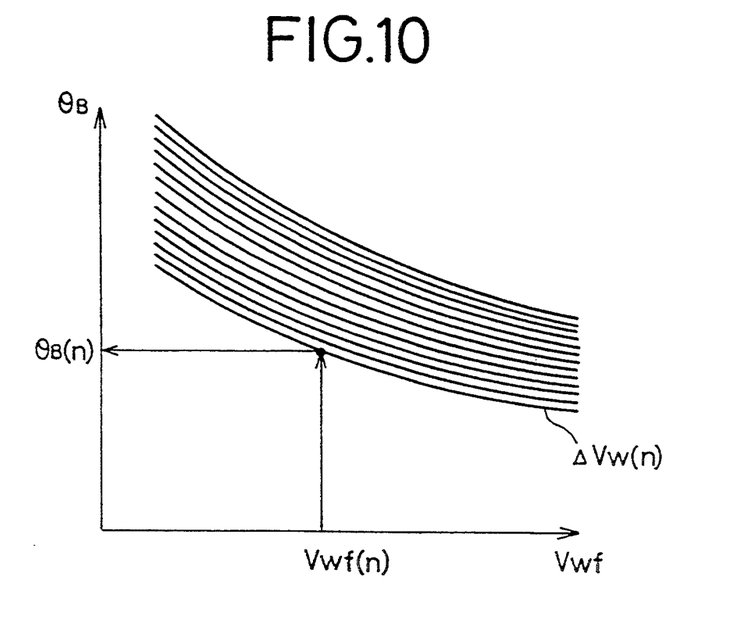
FIG. 10 is a graph for describing a relationship between a peripheral velocity of the driven wheel and a banking angle at a certain difference in peripheral velocities between the driven wheel and the driving wheel, both of which are obtained by the target slippage ratio setting device shown in FIG. 1.

If the estimated velocity of the vehicle $V_{ref(n)}$ is greater than 70 km/h or the estimated velocity of the vehicle $V_{ref(n)}$ is greater than 60 km/h and less than 70 km/h and the steering angle $\theta_{h(n)}$ is greater than 2° (Steps S27 and S28), it is then decided that there is no correlation between the banking angle $\theta_{B(n)}$ and the steering angle $\theta_{h(n)}$, and the difference $\Delta V_{w(n)}$ between the peripheral velocities $V_{wf(n)}$ and $V_{wr(n)}$ of the front and rear wheels 14 and 16 is determined (Step S30). Then, the banking angle $\theta_{B(n)}$ is obtained based on the wheel peripheral velocity $V_{wf(n)}$ and the difference $\Delta V_{w(n)}$ using the LUT 48 shown in FIG. 10 (see regions (VI) and (V) in FIG. 8). The relationship between the wheel peripheral velocity $V_{wf(n)}$ and the banking angle $\theta_B$ in the case of each difference $\Delta V_{w(n)}$ set based on experimental data, is stored in the LUT 48. The banking angle $\theta_{B(n)}$ is calculated based on the data (see the arrow in FIG. 10) (Step S31). The banking angle $\theta_B$ is calculated in Step S31 because the difference $\Delta V_w$ takes place due to the fact that radii of the front and rear wheels differ from each other and the difference $\Delta V_w$ varies as the actual turning radius of each wheel changes depending on the banking angle $\theta_B$.

After the banking angle $\theta_{B(n)}$ has been determined in Steps S24, S25, S29 and S31 in this way, the calculation of the banking angle $\theta_{B(n)}$ is further repeated (Step S32).

The banking angle $\theta_{B(n)}$ is calculated in this way and outputted to the target slippage ratio calculating circuit 56.

In the present invention, the peripheral accelerations $\alpha_{wf}$ and $\alpha_{wr}$ of the driven and driving wheels and the slippage ratios $S_f$ and $S_r$ are calculated and the coefficients of friction of the wheels $\lambda_f$ and $\mu_r$ are calculated. Hereupon, the way of calculating the coefficient of friction of the driven wheel (front wheel 14) will be described with reference to FIG. 11.

The signal indicative of the peripheral velocity $V_{wf}$ of the front wheel 14, which has been determined by the wheel speed calculating circuit 32, is outputted to a wheel acceleration calculating circuit 50. The wheel acceleration calculating circuit 50 calculates the acceleration of the front wheel $\alpha_{wf}$ based on the wheel peripheral velocity $V_{wf}$.

Figure 11:
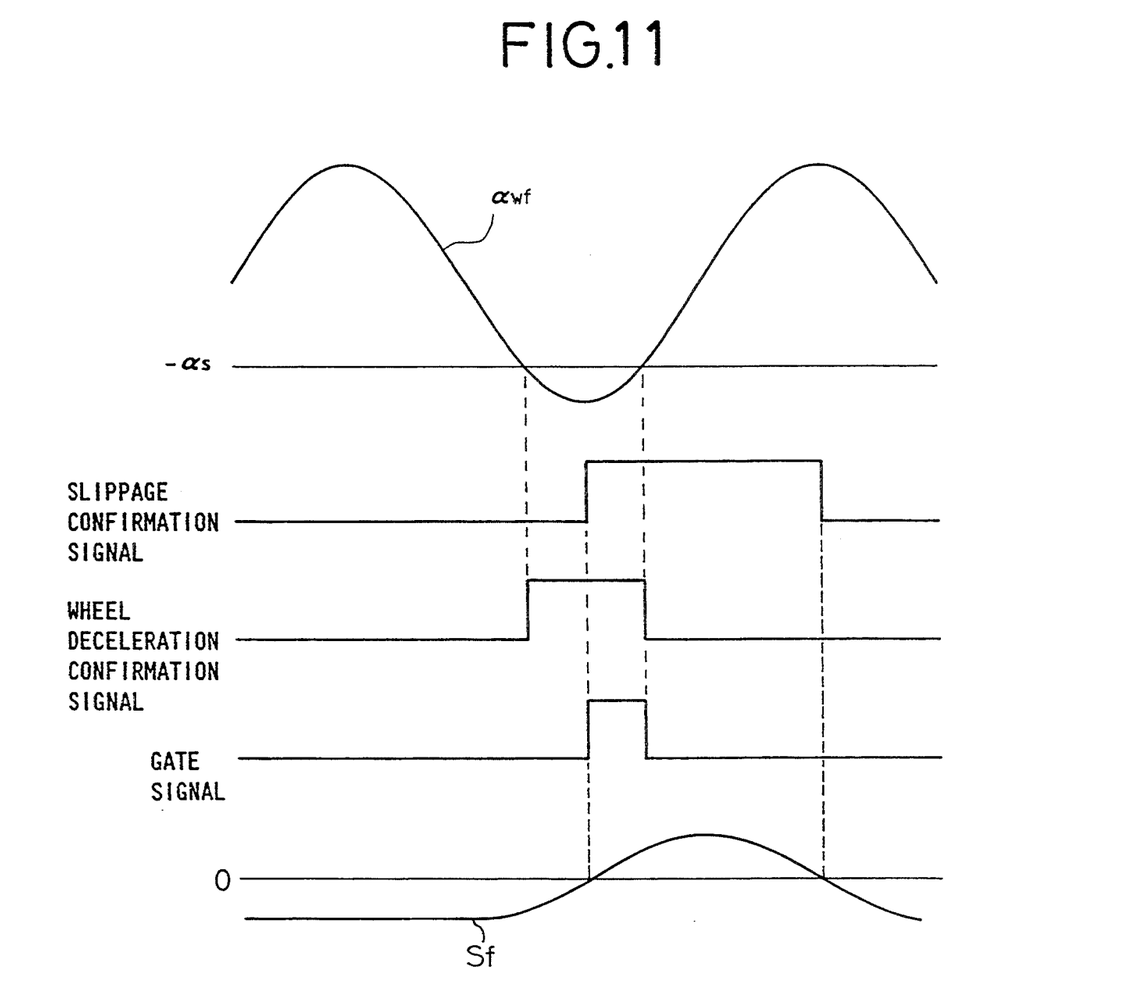
FIG. 11 is a waveform diagram for explaining the generation of a gate signal by the target slippage ratio setting device shown in FIG. 1.

The slippage ratio $S_f$, which has been determined by the slippage ratio calculating circuit 38, is outputted to the gate signal generating circuit 52 together with the peripheral acceleration of the wheel $\alpha_{wf}$. The gate signal generating circuit 52 generates a slippage confirmation signal which goes high when $S_f > 0$, that is, when each wheel is slipping on the road surface, as shown in FIG. 11. Further, the gate signal generating circuit 52 produces a wheel deceleration confirmation signal which goes high when $\alpha_{wf} \leq -\alpha_s$ ($\alpha_s$ is positive predetermined value), that is, when the wheel peripheral velocity $\alpha_{wf}$ is less than or equal to a predetermined value. The gate signal generating circuit 52 outputs the logical product of the slippage confirmation signal and the wheel deceleration confirmation signal to the friction coefficient calculating circuit 54 as a gate signal. The generation of the gate signal suggests the possibility that the brake control system will enter into the limiting control mode for limiting the hydraulic pressure of the brake.

The friction coefficient calculating circuit 54 detects a rise in the gate signal and starts computing the coefficient of friction. The slippage ratio $S_r$ of the rear wheel 16, which has been determined in the same manner as that of the front wheel 14, and the acceleration of the vehicle $G_x$ are supplied to the friction coefficient calculating circuit 54.

In the friction coefficient calculating circuit 54, the coefficient of friction $\mu_f$ between the road surface and the front wheel 14 is determined from the following equation based on the slippage ratio $S_r$ of the rear wheel 16 and the acceleration of the vehicle $G_x$:

$$\mu_f = (A - B \times K_x) \times G_x$$

where A and B are constants, and $K_x$ represents a coefficient set in advance according to the slippage ratio $S_r$ of the rear wheel 16.

That is, when the coefficient of friction $\mu_f$ between the road surface and the front wheel 14 is determined from the acceleration of the vehicle $G_x$, the term $B \times K_x$ as a correction term related to the slippage ratio $S_r$ of the rear wheel 16 is subtracted from the term $A \times G_x$. Thus, the coefficient of friction $\mu_f$ between the road surface and the front wheel 14 can be detected accurately.

Similarly to the front wheel 14, a gate signal is produced only when both the peripheral acceleration $\alpha_{wr}$ and the slippage ratio $S_r$ of the rear wheel 16 satisfy respective predetermined conditions. In such case, the coefficient of friction $\mu_r$ between the road surface and the rear wheel 16 can be obtained based on the slippage ratio $S_f$ of the front wheel 14 and the acceleration of the vehicle $G_x$.

The estimated velocity of the vehicle $V_{ref(n)}$, the banking angle $\theta_{B(n)}$ and the coefficient of friction $\mu_{f(n)}$, which have been determined in the above-described manner, are outputted to the target slippage ratio calculating circuit 56. The target slippage ratio calculating circuit 56 calculates a target slippage ratio $Smax_f$ in the following manner.

Figure 12:
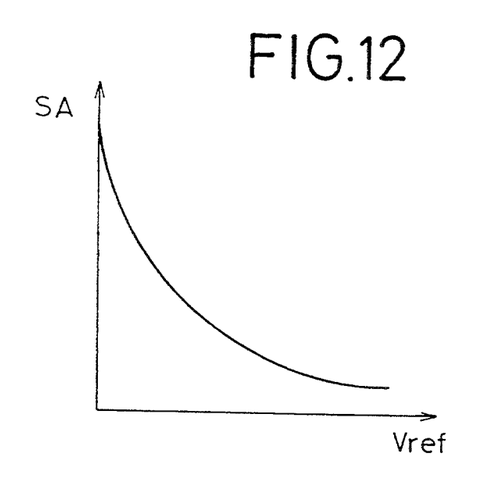
FIG. 12 is a graph for describing a relationship between an estimated velocity of the vehicle and the optimum slippage ratio both of which are obtained by the target slippage ratio setting device depicted in FIG. 1.
Figure 13:
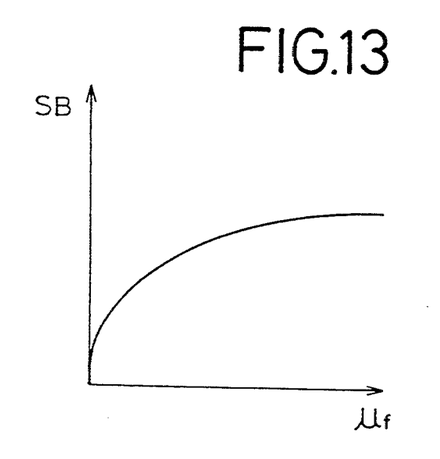
FIG. 13 is a graph for describing a relationship between a coefficient of friction of a road surface and the optimum slippage ratio both of which are obtained by the target slippage ratio setting device illustrated in FIG. 1.
Figure 14:
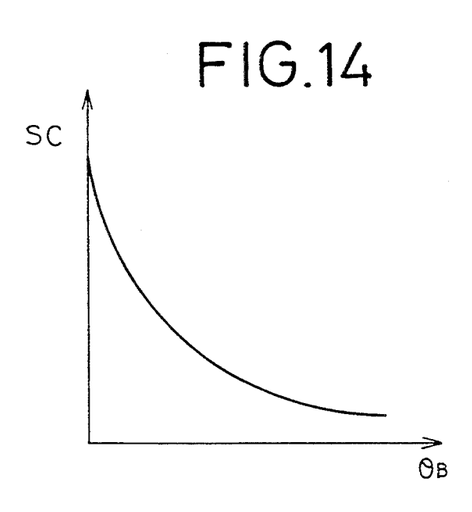
FIG. 14 is a graph for describing a relationship between a banking angle and the optimum slippage ratio both of which are obtained by the target slippage ratio setting device shown in FIG. 1.

The relationship between the estimated velocity of the vehicle $V_{ref}$ and the optimum slippage ratio SA; the relationship between a coefficient of friction $\mu_f$ and the optimum slippage ratio SB; and the relationship between a banking angle $\theta_B$ and the optimum slippage ratio SC, have been experimentally determined as providing the optimum braking force, as illustrated in FIGS. 12 through 14. These relationships are converted into the following equations.

The optimum slippage ratio SA with respect to the estimated velocity of the vehicle $V_{ref}$ is approximated as:

$$SA = d - e \times V_{ref}$$

where SA represents a slippage ratio at which the optimum braking force is obtained, and d and e are constants.

The optimum slippage ratio SB with respect to the coefficient of friction $\mu_f$ is approximated as:

$$SB = f/\mu_f + g$$

where SB represents a slippage ratio at which the optimum braking force is obtained, and f and g are constants.

The optimum slippage ratio SC with respect to the banking angle $\theta_B$ is approximated as:

$$SC = h - i \times \theta_B$$

where SC represents a slippage ratio at which the optimum braking force is obtained, and h and i are constants.

Under this condition, the target slippage ratio $Smax_f$ may be directly determined from the estimated velocity of the vehicle $V_{ref(n)}$, the coefficient of friction $\mu_{f(n)}$ and the banking angle $\theta_{B(n)}$, which have been calculated based on the slippage ratios SA, SB and SC each capable of providing the optimum braking force. However, the following process is conducted to reduce the number of parameters to two.

To convert a coefficient of friction $\mu_f$ and a banking angle $\theta_B$ into one parameter, the optimum slippage ratio SD obtained based on the coefficient of friction $\mu_f$ and the banking angle $\theta_B$ is approximated as:

$$SD = j \times \theta_B/\mu_f + k$$

where SD represents a slippage ratio at which the optimum braking force is obtained, and j and k are constants.

A target slippage ratio $Smax_{f(n)}$ is determined based on a function f (SA, SD) (see FIG. 15) which has been experimentally determined from the optimum slippage ratios SA and SD obtained in the above-described manner and which has been stored in the LUT 57.

Figure 15:
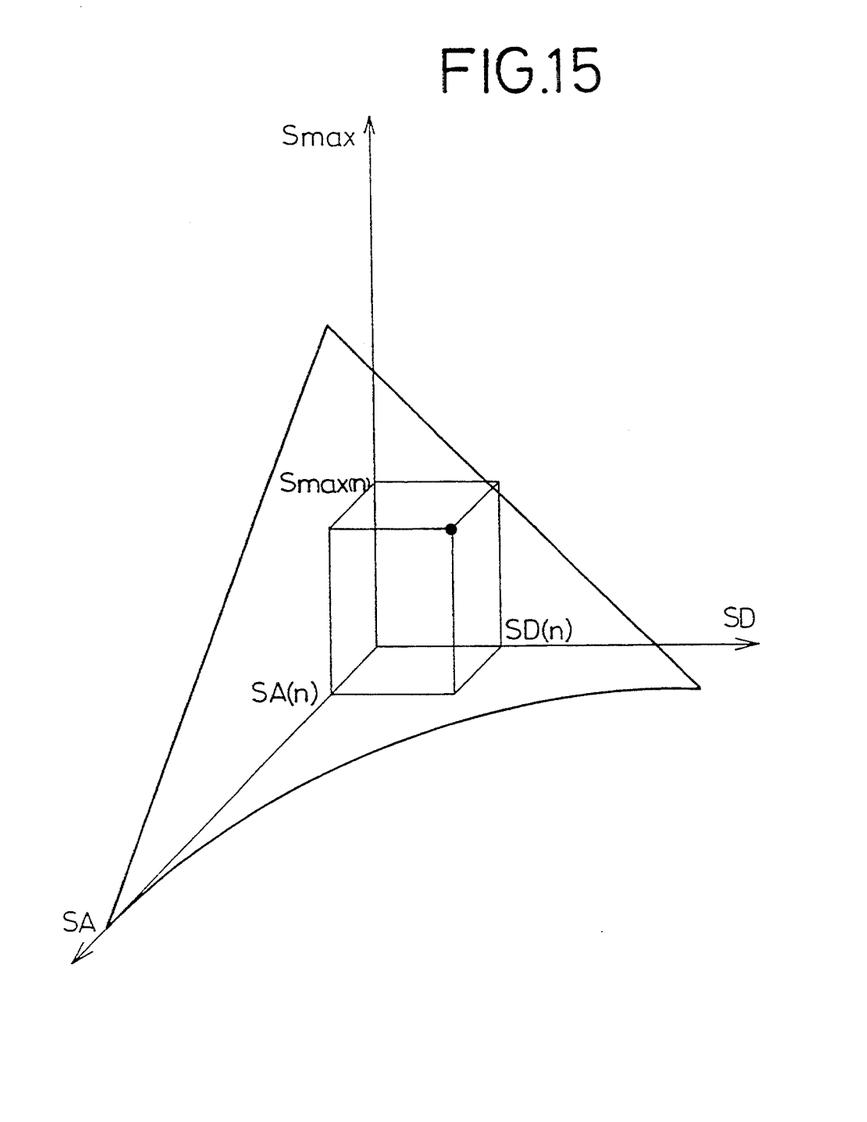
FIG. 15 is a view for explaining the way of determining a target slippage ratio by the target slippage ratio setting device depicted in FIG. 1.

After the optimum slippage ratio $SA_{(n)}$ has been calculated from the calculated estimated velocity of the vehicle $V_{ref(n)}$ and the optimum slippage ratio $SD_{(n)}$ has been calculated from the coefficient of friction $\mu_{f(n)}$ and the banking angle $\theta_{B(n)}$, for example, the target slippage ratio $Smax_{f(n)}$ is determined using the function f (SA, SD) as shown in FIG. 15.

While the method described above for determining target slippage ratio Smax used f (SA, SD), where SD was related to $\{\theta_B$ and $\mu_f\}$, the method is easily modified to collapse any two of $\{V_{ref}, \theta_B, \mu_f\}$ into one parameter SD, so that Smax may be also calculated based on f (SB, SD) or F (SC, SD).

The target slippage ratio $Smax_{f(n)}$ determined in this way is outputted to the restraint coefficient calculating circuit 58. The restraint coefficient calculating circuit 58 calculates a restraint coefficient $K_f (= Smax_r/SO_f)$ corresponding to the ratio of the target slippage ratio $Smax_r$ to the target slippage ratio $SO_f$ of the conventional brake control system. The rate of increase and decrease in the hydraulic pressure of the brake can be suitably controlled by the restraint coefficient $K_f$ calculated in the above-described manner. A restraint coefficient $K_r$ is also calculated in the same manner described above.

In the present invention, as described above, the relational expressions of the optimum slippage ratios with respect to the estimated velocity of the vehicle $V_{ref}$, the coefficients of friction $\mu_f$ and $\mu_r$ and the banking angle $\theta_B$ all of which have been obtained in the above-described manner, are obtained based on the estimated velocity of the vehicle $V_{ref}$, the coefficients of friction $\mu_f$ and $\mu_r$ and the banking angle $\theta_B$. The target slippage ratios $Smax_f$ and $Smax_r$ are determined based on the optimum slippage ratios SA and SD using the relational expressions, of these relational expressions, of the optimum slippage ratios obtained based on the coefficients of friction $\mu_f$ and $\mu_r$ and the banking angle $\theta_B$. Thus, the estimated velocity of the vehicle $V_{ref}$ or the vehicle behavior such as the banking angle $\theta_B$ or the like makes contributions to the setting of the target slippage ratios. As a result, the control of braking of the vehicle can be carried out properly. When such a function is added to a vehicle control system which does not take into account information about the behavior of the vehicle, the braking control corresponding to the target slippage ratios $Smax_f$ and $Smax_r$ can be carried out by simply multiplying the control signals corresponding to the target slippage ratios $SO_f$ and $SO_r$ determined as a result of calculation by the system, by the restraint coefficients $K_f$ and $K_r$.

The respective values of the estimated velocity $V_{ref}$ (=60 km/h and 70 km/h) and the steering angle $\theta_h$ (=2°), which have been used as the criteria in the present invention, represent values determined depending on the characteristics of the vehicle. However, the estimated velocity of the vehicle and the steering angle are not necessarily limited to these values.

Having now fully described the invention, it will be apparent to those skilled in the art that many changes and modification can be made without departing from the spirit or scope of the invention as set forth herein.

What is claimed is:

1. A device for setting a target slippage ratio to control a brake system in a vehicle having front and rear wheels, comprising:

wheel velocity detecting means for detecting peripheral velocities of each wheel;

vehicle acceleration detecting means for detecting an acceleration or deceleration of the vehicle;

estimated vehicle velocity calculating means for calculating an estimated velocity of the vehicle based on the peripheral velocities of the front and rear wheels and the acceleration or deceleration of the vehicle;

banking angle calculating means for calculating the banking angle of the vehicle;

friction coefficient calculating means for calculating a coefficient of friction between each wheel and the road surface, based on the slippage ratio of each wheel calculated from the peripheral velocity of each wheel and the estimated velocity of the vehicle, and on the acceleration or deceleration of the vehicle;

storing means for storing (i) the relationship of the optimum slippage ratio and said calculated banking angle, (ii) the relationship of the optimum slippage ratio and said calculated estimated velocity of the vehicle, and (iii) the relationship of the optimum slippage ratio and said calculated coefficient of friction;

target slippage ratio setting means for setting a target slippage ratio for each wheel at which optimal braking force is obtained, based on said stored relationships with said calculated banking angle, said calculated estimated velocity of the vehicle and said calculated coefficient of friction; and means for controlling said brake system to apply a braking force to at least one of said front and rear wheels while maintaining said target slippage ratio.

2. A device according to claim 1, wherein said storing means stores: (i) the experimentally determined relationship between the slippage ratio at which the optimum braking force is obtained and the calculated banking angle, (ii) the experimentally determined relationship between the slippage ratio and the calculated estimated velocity of the vehicle and (iii) the experimentally determined relationship between the slippage ratio and the calculated coefficient of friction of the road surface, wherein said relationships are represented by approximating formulas.

3. A device according to claim 2, wherein said target slippage ratio setting means sets said target slippage ratio based on the stored relationships with the calculated estimated velocity of the vehicle, the calculated banking angle and the calculated coefficient of friction.

4. A device according to claim 2, wherein said brake system comprises a brake valve providing a present slippage ratio, said means for controlling said brake system further comprising restraint coefficient calculating means for calculating the restraint coefficient being the ratio of said target slippage ratio to said present slippage ratio, and outputting said restraint coefficient to said brake system as a factor to correct the control of the brake valve.

5. A device according to claim 3, wherein said brake system comprises a brake valve providing a present slippage ratio said means for controlling said brake system further comprising restraint coefficient calculating means for calculating the restraint coefficient being the ratio of said target slippage ratio to said present slippage ratio, and outputting said restraint coefficient to said brake system as a factor to correct the control of the brake valve.

6. A device according to claim 1, wherein said storing means stores the relationship between: (i) two of (a) the calculated banking angle, (b) the calculated estimated velocity of the vehicle and (c) the calculated coefficient of friction, and (ii) the slippage ratio at which the optimum braking force is obtained.

7. A device according to claim 6, wherein said target slippage ratio setting means sets said target slippage ratio based on the stored relationships with the calculated estimated velocity of the vehicle, the calculated banking angle and the calculated coefficient of friction.

8. A device according to claim 6, wherein said brake system comprises a brake valve providing a present slippage ratio said means for controlling said brake system further comprising restraint coefficient calculating means for calculating the restraint coefficient being the ratio of said target slippage ratio to said present slippage ratio, and outputting said restraint coefficient to said brake system as a factor to correct the control of the brake valve.

9. A device according to claim 7, wherein said brake system comprises a brake valve providing a present slippage ratio said means for controlling said brake system further comprising restraint coefficient calculating means for calculating the restraint coefficient being the ratio of said target slippage ratio to said present slippage ratio, and outputting said restraint coefficient to said brake system as a factor to correct the control of the brake valve.

10. A device according to claim 1, wherein said target slippage ratio setting means sets said target slippage ratio based on the stored relationships with the calculated estimated velocity of the vehicle, the calculated banking angle and the calculated coefficient of friction.

11. A device according to claim 10, wherein said brake system comprises a brake valve providing a present slippage ratio said means for controlling said brake system further comprising restraint coefficient calculating means for calculating the restraint coefficient being the ratio of said target slippage ratio to said present slippage ratio, and outputting said restraint coefficient to said brake system as a factor to correct the control of the brake valve.

12. A device according to claim 1, wherein said brake system comprises a brake valve providing a present slippage ratio said means for controlling said brake system further comprising restraint coefficient calculating means for calculating the restraint coefficient being the ratio of said target slippage ratio to said present slippage ratio, and outputting said restraint coefficient to said brake system as a factor to correct the control of the brake valve.

* * * * *